(No Model.)
S. SMITH.
WIRE FRAME FOR PAPER MAKING MACHINES.
No. 538,886. Patented May 7, 1895.
Fig. 1.     Fig. 2.
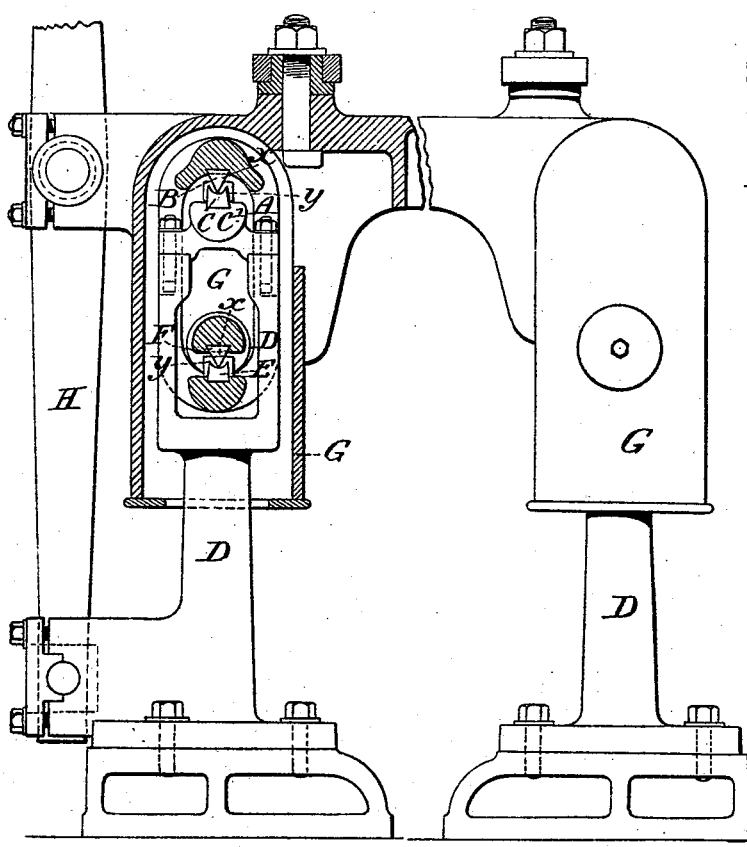
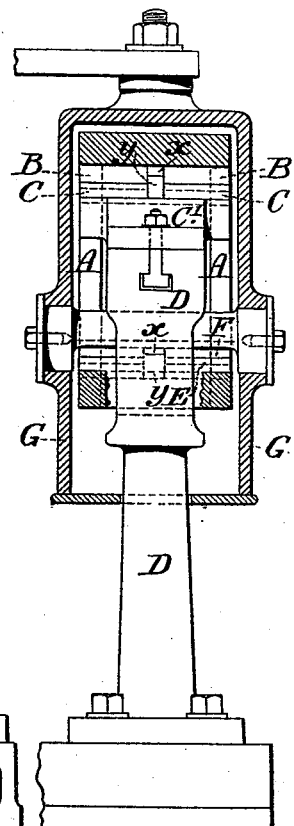
Fig. 3.
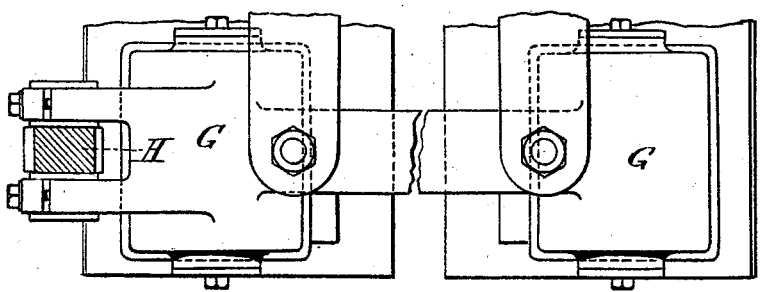
Witnesses
George Baumann
Edith J. Griswold
Inventor
Samuel Smith
By his Attorneys
Howson and Howson

UNITED STATES PATENT OFFICE.

SAMUEL SMITH, OF BURY, ENGLAND, ASSIGNOR TO BENTLEY & JACKSON, OF SAME PLACE.

WIRE FRAME FOR PAPER-MAKING MACHINES.

SPECIFICATION forming part of Letters Patent No. 538,886, dated May 7, 1895.

Application filed June 5, 1894. Serial No. 513,556. (No model.) Patented in England June 4, 1892, No. 10,691.

*To all whom it may concern:*

Be it known that I, SAMUEL SMITH, patternmaker, a subject of the Queen of Great Britain and Ireland, residing at 25 Parker Street, Bury, in the county of Lancaster, England, have invented certain Improvements in Wire Frames for Paper-Making Machines, (for which I have obtained, in conjunction with John Broad Jackson and George Bentley, a patent in Great Britain, No. 10,691, dated June 4, 1892,) of which the following is a specification.

The object of this invention is to so mount the wire frames of paper making machines that they are worked or vibrated with greater ease and less friction than hitherto.

According to this invention the frame is mounted by bearings upon links or hangers which are themselves mounted upon bearings in the standards or supports of the machine. The bearings in each case are preferably V pieces rocking upon suitable bed pieces the said V pieces and bed pieces being preferably of steel and arranged so that they can be removed for repair or renewal but bearings of circular or other form may be employed if desired. The bearings are preferably inclosed or boxed in by parts attached to, or forming part of, the frame or otherwise so as to protect the bearings from water or other matter.

A convenient arrangement for carrying out this invention is illustrated in the accompanying drawings, of which—

Figure 1 shows sufficient of a paper-making machine to illustrate my improved means for suspending the wire frames, part of this view being in section. Fig. 2 is a sectional view at right angles to Fig. 1, and Fig 3 is a plan.

The links or hangers are each in the form of loops A connected top and bottom by transverse pieces with a V bearing B at the top or upper part resting on a bearing piece C on the upper end of a support C' connected to the main frame or standard D of the machine. Each said loop A has a bearing piece E on its lower part on which bearing piece rests a V piece F carried by the vibrating wire frame G.

The bearings may be boxed in by parts forming part of the frame G as shown. The wire frame may be worked or vibrated in any suitable way such as for instance by a crank or cam and the connecting rod H.

The sidewise movement of the V' pieces relatively to their bearings is prevented by the recesses and projections $x\ y$.

Having now particularly described and ascertained the nature of my said invention and in what manner the same is to be performed, I declare that what I claim is—

1. In means for suspending the wire frames of paper making machines, the combination of the wire frame having a bearing piece, with open loops or links, top and bottom transverse connecting pieces, the upper transverse piece carrying a bearing piece, and the lower one a bearing block to support the bearing piece of the frame and a standard having a bearing piece to support the said bearing piece on the link, all substantially as and for the purpose set forth.

2. In means for suspending the wire frames of paper making machines, the combination of the wire frame having a downwardly extending box carrying a bearing piece of the frame, with a swinging open loop or link provided at its lower part with a bearing block to support the said bearing piece of the frame, the said latter bearing piece passing through the open loop or link, the loop or link being provided at its upper part with a bearing piece, and a standard having a bearing piece to support the bearing piece on the link, all substantially as and for the purposes set forth.

In testimony whereof I have signed my name to this specification in the presence of two subscribing witnesses.

SAMUEL SMITH.

Witnesses:
WILLIAM HY. DARLINGTON,
J. F. HALFORD.